March 12, 1957     E. KIRCH     2,785,218
ELECTRIC CABLES WITH LAMINATED ALUMINUM AND LEAD SHEATH
Filed June 18, 1952
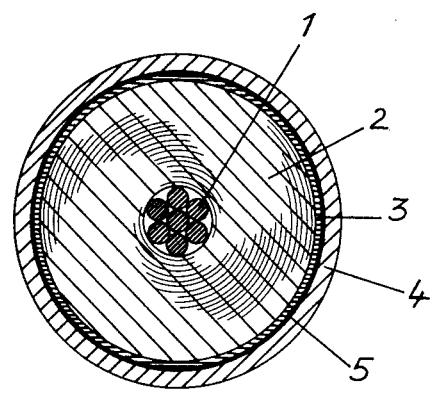
Inventor
E. Kirch United States Patent Office 2,785,218
Patented Mar. 12, 1957

2,785,218

ELECTRIC CABLES WITH LAMINATED ALUMINUM AND LEAD SHEATH

Ernst Kirch, Koln-Mulheim, Germany, assignor to Felten & Guilleaume Carlswerke Aktiengesellschaft, Koln-Mulheim, Germany Application June 18, 1952, Serial No. 294,181

Claims priority, application Germany July 30, 1951

5 Claims. (Cl. 174—106)

This invention relates to an electric cable provided with a double sheathing.

Electric cables are generally provided with a lead sheathing the main object of which is to protect the cable core against the penetration of moisture. The reasons why lead is preferred for the sheathing are: its capacity of being easily pressed, its perfect tightness to water vapour, its ductility which permits the cable to be easily bent, as well as its very great resistance to corrosion. As against this, one has to put up with its disadvantages, namely, the high specific weight of lead, the possibility of its being easily damaged, as well as very small resistance of a lead sheathing to inner and outer pressure owing to the very low creep limit of this material. The fact of its being easily damaged, as well as the small resistance to internal pressure, requires a comparatively expensive protection by bandages and armourings and, in spite thereof, additionally large dimensioning of the sheathing itself.

It is understandable, that in these circumstances it has been tried to obtain a substitute for the lead as a sheathing material, and that the one selected was aluminium, which, likewise is comparatively easily pressable, but has a small specific weight. However, aluminium sheathings have the disadvantage that when they are of great thickness they can be bent only with difficulty and, when bent, they exert a correspondingly high pressure on the cable core. On the other hand, when the sheathings are made of small thickness, they crack easily or, at least, they tend to make sharp folds.

Owing to these difficulties due to the properties of the material which can be but little controlled, it is proposed according to the present invention to use, instead of a sheathing of lead or of aluminium, a double sheathing constituted by lead and aluminium, which sheathing is characterised by this that both sheathings are firmly adhered together on their separation surface, whereby it is endeavoured that this connection shall be as homogeneous as possible along the whole separating surface. The connection may be effected either by soldering or by sticking together.

In this way, it is possible to obtain a double sheathing, in which the expenditure in material is decidedly reduced, and which combines to a high degree the favourable properties of both sheathings without at the same time combining to the same high degree the disadvantages of the two kinds of sheathings. The invention includes double sheathings in which the aluminium one lies inside and the lead one outside, as well as sheathings in which the lead one is inside and the aluminium one outside. In many cases, the construction in which the aluminium sheathing is inside and the lead sheathing is outside has special advantages, since thereby the aluminium, which is less resistant to corrosion is protected by the lead which is more resistant.

It has been known since the beginning of the cable industry to use, instead of a thick lead sheathing, two thin lead sheathings which are pressed onto one another and between which there is interposed a layer of bitumen. This, however, was done since at that time one was not yet able to press a lead sheathing free of holes. In these sheathings, which were made of the same material, the object of providing the bitumen layer was to prevent any water, which may have entered through a hole in the outer sheathing, from penetrating through the intermediate space between the two sheathings up to a faulty spot in the inner sheathing and reach the cable core.

The advantages which can be secured by a double sheathing according to the invention will now be explained in connection with the example of a 100 kv. cable, subjected to an internal pressure of about 4 to 5 atms. Such cables which have an internal diameter under the sheathing of about 40 mms. were generally manufactured with lead sheathings about 2½ up to 3 mms. thick. In order to obtain the required resistance to internal pressure frequently a double bandage of copper, brass, "Aldrey" or aluminium bands was placed on, which had a thickness of about 0.2, and in the case of aluminium 0.3 mm. A double sheathing according to the invention having an aluminium thickness of only 0.3 mm. and a lead thickness of 0.8 up to 1 mm. can give the same service as a bandage sheathing of the abovementioned dimensions. It will thus be seen that it is possible to effect an economy of material of 50% and more in the case of the two materials aluminium and lead.

By using the dimensions above mentioned, there is obtained, in addition to the required resistance to internal pressure, in contrast with the use of only a thin aluminium sheathing of say 0.8 to 1 mm. thickness, a substantially improved flexibility, a more favourable retention of the shape (freedom of folds after bending), as well as a smaller exertion of force on the cable core. Aluminium sheathings about 0.3 to 0.4 mm. thick, the manufacture of which, nowadays, presents no longer a problem, have, in addition thereto, the great advantage that one can produce great lengths with presses of comparatively small charge. In this way, it is avoided that, when the receptacle is again filled, that is to say when the press is stopped, the core is damaged by the high temperature of the sheathing. Moreover, the heat capacity of such a thin sheathing is so small, that even when pressed directly on the cable core, no damage can any longer be done by the high temperature of the sheathing, if for instance use is made of the usual metallisation of the cores by highly metallised paper or a thin metal band, and the cooling of the sheathing is effected from the outside in the usual way.

To enable the two metal sheathings to be soldered together it is advantageous to tin the aluminium sheathing on its outer surface.

Of course, double sheathings of the kind referred to must not be pressed directly onto the cable. They may also be produced as so-called "drawn" sheathings with a slightly larger diameter and be reduced in the known manner by a drawing tool to the diameter of the cable core. Naturally, when the lead sheathing is connected with the aluminium sheathing by a layer of tin, it has not to be pressed in the usual manner onto the aluminium tube, but it may be produced also, in a known manner, by a dipping or casting process.

If a sticking means is used between the aluminium and the lead sheathing, it is necessary that a firm homogeneous adherence be effected throughout the whole length, more particularly in the case of temperatures at which the cable bends. As sticking means use is preferably made of an adhesive which adheres to a metal and is not soluble in water, more particularly a synthetic sticking material. In the case of double sheathings in which a layer of tin is provided between the aluminium and the lead tube, the final soldering of the two sheathings may, of course, be effected subsequently by an electric current.

The accompanying drawing illustrates by way of example and diagrammatically a high tension cable according to the invention in cross section.

1 is the conductor and 2 is the insulation of the cable which is subjected to internal pressure. 3 is the aluminium layer and 4 is the lead layer of the cable sheathing placed thereon which layers are adheringly connected together over the whole of their supporting surface by the intermediate layer 5 which may for instance consist of tin or of a synthetic adhering material.

I claim:

1. An electric cable with a double sheathing consisting of two concentric seamless pressed metal layers surrounding in common the whole of the insulated cable core characterised by this that it consists of an aluminium layer and of a lead layer, which are adherently connected with one another throughout their surface of separation.

2. A cable according to claim 1, characterised by this that the aluminium layer lies inside and the lead layer outside.

3. A double sheathing according to claim 2, characterised by this that the aluminium layer has a coating of tin on its outer surface.

4. A cable according to claim 1, characterised by this that the aluminium and lead layers of the sheathing are adherently connected by means of an adhesive which adheres firmly to metal and is not soluble in water.

5. A cable according to claim 1, characterised by this that the aluminium and the lead layers are soldered together.

References Cited in the file of this patent
UNITED STATES PATENTS

| | | |
|---|---|---|
| 1,684,363 | Schurer | Sept. 11, 1928 |
| 1,866,145 | Wilson | July 5, 1932 |
| 2,045,104 | Rosch | June 23, 1936 |
| 2,312,506 | Tomlinson et al. | Mar. 2, 1943 |